United States Patent
Morin et al.

[11] Patent Number: 6,115,995
[45] Date of Patent: Sep. 12, 2000

[54] DEVICE FOR OBTAINING A STRIP OF TOTALLY ENVELOPED AND LIGHT-TIGHT PHOTOSENSITIVE MATERIAL

[76] Inventors: Yves Morin, Kodak Industrielle; Michel Naudin, Kodak Industrie, both of 71102 Chalon sur Saone Cedex, France

[21] Appl. No.: 09/296,028

[22] Filed: Apr. 21, 1999

[30] Foreign Application Priority Data

Apr. 29, 1998 [FR] France .................................. 98 05687

[51] Int. Cl.7 .................................................. B65B 61/04
[52] U.S. Cl. ............................... 53/397; 53/415; 53/435; 53/520; 53/580; 53/136.1; 53/136.5
[58] Field of Search ............................... 53/136.1, 136.3, 53/136.5, 397, 415, 435, 284.4, 520, 580; 156/152

[56] References Cited

U.S. PATENT DOCUMENTS

| | | | |
|---|---|---|---|
| 3,762,252 | 10/1973 | Hujer | 53/390 |
| 5,159,798 | 11/1992 | Hannon | 53/136.3 |
| 5,185,983 | 2/1993 | Slater | 53/136.3 |

*Primary Examiner*—John Sipos
*Attorney, Agent, or Firm*—Noelle Leray; David A. Novais

[57] ABSTRACT

The invention relates to a device for obtaining a strip of photosensitive material totally enveloped in a light-tight way. The device comprises a light-tight box provided with two openings which allow the strip to pass therethrough; a cutting member for cutting the strip at a distance D from its end; a connecting member for solidly connecting in a light-tight way and without contact between them, the strip of length D and the rest of the strip coming from the reel using a light-tight material applied to both faces of each strip; and a linking member for linking up the material present on one face and the material present on the other face between the two strips.

6 Claims, 1 Drawing Sheet

DEVICE FOR OBTAINING A STRIP OF TOTALLY ENVELOPED AND LIGHT-TIGHT PHOTOSENSITIVE MATERIAL

FIELD OF THE INVENTION

The present invention relates to a device and a process for obtaining a strip of photosensitive material in a totally enveloped and light-tight way, in particular for obtaining selected lengths of industrial radiographic film.

BACKGROUND OF THE INVENTION

Generally, industrial radiographic film is marketed in reels of long lengths of film, with the film being enveloped in a light-tight material. When radiographic film is wanted for use in thermal or nuclear electric power station constructions, a strip of radiographic film has to be cut to the length wanted in order to use it. The problem encountered is that part of the film around the cut is exposed to light. To avoid this problem, users of radiographic film fold the film and form two consecutive "U"s, and then wind the rounded part of each "U" using an adhesive. Thus each "U" has its two branches made solid. Then they cut the strip between the two "U"s. The problem encountered using this technique is that the strip of radiographic film is folded and can be damaged during this operation. Also, this operation is not always very convenient.

SUMMARY OF THE INVENTION

It is an object of the present invention to provide a device for cutting to a set length, in full light, a strip of photosensitive material coming from a reel, with the strip being enveloped in a totally light-tight way.

It is another object of the present invention to provide a process for cutting to a set length, in full light, a strip of photosensitive material coming from a reel, with the strip being enveloped in a totally light-tight way, the process of the invention avoiding all deterioration of the film and being convenient to use.

The invention relates to a device for obtaining a strip of photosensitive material of variable length D totally enveloped with light-tight material coming from a reel of photosensitive material in strip totally enveloped in a light-tight material. The device comprises a light-tight box provided with:

a first opening (30) which allows the introduction of the strip (20) of the photosensitive material coming from the reel;

a means (31) for ensuring the light-tightness of the box, the means (31) being provided on the first opening (30);

a second opening (40) which allows the strip (20) to come out;

a means (41) for ensuring the light-tightness of the box, the means (41) being provided on the second opening (40);

a means (50) for cutting the strip at a distance D from its end and to separate by a length L the strip of length D and the rest of the strip coming from the reel;

a means (80) for solidly connecting in a light-tight way and without contact between them, the strip of length D and the rest of the strip coming from the reel using a light-tight material (83) applied to both faces of each strip;

a means (90) to link up the material present on one face and the material present on the other face between the two strips.

The invention further relates to a process for obtaining a strip of photosensitive material of variable length D totally enveloped in a light-tight way coming from a reel of photosensitive material in strip totally enveloped in light-tight material. The process comprises the following steps:

a) introducing the strip of photosensitive material coming from the reel in a light-tight box;

b) bringing the strip out of the box to a length such that the strip can be cut at a distance D from the end of the strip coming from the reel;

c) cutting the strip at the distance D from its end and separating inside the box the strip of length D from the rest of the strip coming from the reel;

d) solidly connecting in a light-tight way and without contact between them the strip of length D and the rest of the strip coming from the reel using a light-tight material that is applied to both faces of each strip;

e) linking up the light-tight material on one face and the light-tight material on the other face between the two strips;

f) running the strip until the connection is outside the box;

g) cutting the light-tight material so as to obtain a strip of photosensitive material of length D totally enveloped in a light-tight way.

The invention further relates to a device for obtaining a strip of photosensitive material. The device comprises a light-tight box having a first light-tight opening which permits the introduction of a strip of photosensitive material into the light-tight box, and a second light-tight opening which permits an exit of said strip from the light-tight box; a cutting member which cuts the strip introduced into the light-tight box at a distance from its end to separate the cut strip by a specified length from a remainder of the strip being introduced into the light-tight box; a connecting member which connects the cut strip and the remainder of the strip so as to be light-tight and spaced from each other, with the connecting member applying a light-tight material to both faces of each strip; and a linking member which links the applied light-tight material between the strips.

BRIEF DESCRIPTION OF THE DRAWINGS

Other features will appear on reading the following description, and referring to the drawings wherein.

DETAILED DESCRIPTION OF THE INVENTION

Figure 1:
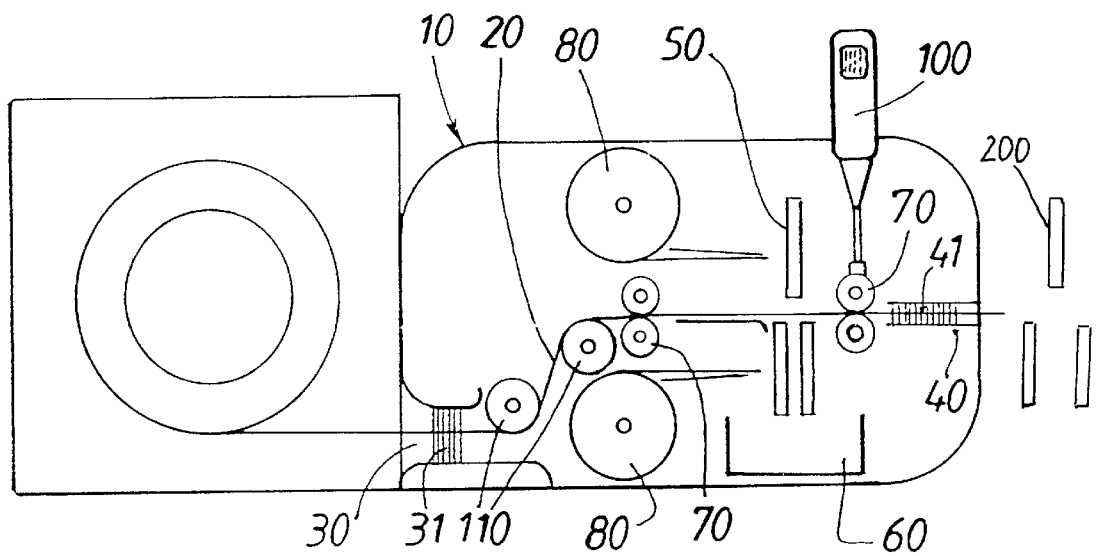
FIG. 1 represents a cross-section of the device according to the invention.

Referring to FIG. 1 the device according to the invention can be seen. The device comprises a light-tight box 10 into which is introduced a strip of radiographic film 20. The film strip 20 is totally enveloped in a light-tight material. The box 10 is provided with a first opening 30 which allows the introduction of the film strip 20 coming from a reel. The opening 30 is fitted with a means 31 for ensuring the light-tightness of the box. The means 31 for example is a light-sealing brush that can be in the form of velvet fabric. The travel of the strip 20 is defined with rollers 110 that allow the strip 20 to run past.

The box 10 further comprises a second opening 40 that allows the connected film strip to come out. The opening 40 is also provided with a means 41 for ensuring the light-tightness of the box. The means 41 for example is a light-sealing brush.

A means 50 for cutting the strip is arranged inside the box. The means 50 are cutting shears arranged so as to slice the strip 20 crosswise. In this embodiment, the cutting shears slice the strip crosswise for a length L. A width of strip 20 of length L is then removed. The length L for example is between 8 mm and 15 mm, preferably equal to about 10 mm. A tray 60 is provided in the box 10 and under the cutting means 50 to receive the film cuttings. The cutting means 50 is operated with a handle, not shown, which is outside the box. In order to hold the strip 20 that has just been cut, one pair of rubber rollers 70 is provided on either side of the cutting means 50, with the strip passing in between the two rollers of each pair 70.

Figure 2:
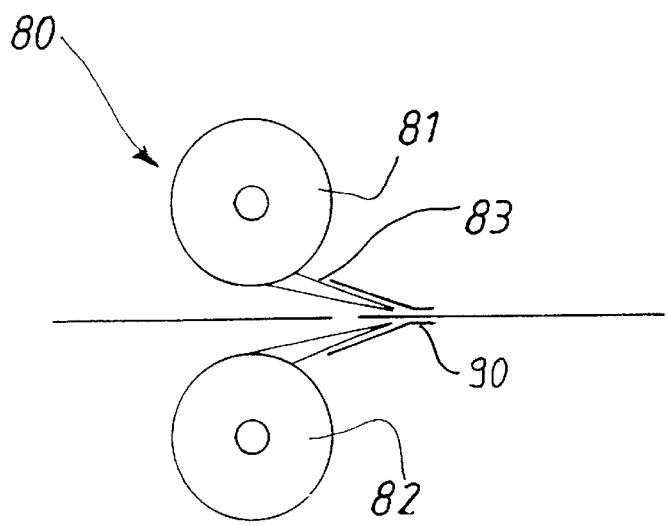
FIG. 2 represents a cross-section of a connecting means.

A means 80 is provided in the box 10 for solidly connecting the cut strip and the rest of the strip coming from the reel using a light-tight material that covers both faces of the strip. The connecting means 80, represented in FIG. 2, comprises two distributors 81, 82 of labels 83, arranged on either side of the band's path. Each distributor 81, 82 applies a label 83 respectively on each face of the strip so as to connect the two strips without contact between them, the two strips remaining distant, for example, by the length L. The distance that separates the two strips after connecting is preferably greater than 8 mm, for example equal to 10 mm. The labels 83 are light-tight adhesive labels. The connecting means is operated with a handle, not shown, which is outside the box.

A means 90 for linking up the label present on one face and the label present on the other face is provided in the box. In this embodiment, since the labels are adhesive, the linking means 90 comprises the connecting means 80 that distributes the adhesive labels 83 by sticking them to each face and thus linking up the labels, between the two strips. In another embodiment wherein the labels are not adhesive, a linking means 90 can be provided comprising for example a heat-sealing device.

Advantageously, a means 100 is provided to measure and display the length of the strip between the end of the strip and the cutting device so as to cut a strip of length D.

Outside the box and after the second opening 40, a means 200, can be provided that allows the connected strip 20 to be cut. The cut is made at the label, on the length L that separates the strip of length D and the rest of the strip coming from the reel. Thus a strip of radiographic film of length D is obtained totally enveloped in a light-tight way. The strip is enveloped with its original packaging and its end is provided with a light-tight label 83.

From a reel of radiographic film enveloped in light-tight packaging, a strip of radiographic film of variable length D, which is totally enveloped in a light-tight way, can be obtained conveniently without deteriorating the film.

The operator introduces the strip 20 of film coming from the reel into the light-tight box 10. The box can be open so that the operator can arrange the strip in the path defined by the rollers 110. The strip 20 is made to come out of the box 10, and then the film is wound out by pulling the end of the strip coming out of the box until the display 100 shows a length of strip equal to D. The operator can then actuate the cutting means 50 using the handle provided for this purpose to cut the strip crosswise for a length equal to L, at the distance D from the end of the strip. Since the cut is made when the film strip is inside the light-tight box, the part of the film that is not covered with the light-tight packaging remains protected from light. The operator then actuates the connecting means 80 to connect the strip of length D and the rest of the strip coming from the reel, with the two strips remaining distant by length L. An adhesive light-tight label 83 is applied to each face of the film strip so as to link the two strips. As the strip has not moved since the cutting operation, the two strips are connected with the labels with a distance L. The operator can then run the connected strip until the connection is outside the box. The operator then cuts the connected strip at the connection, around the middle of the link made with the labels so that the ends of the two consecutive strips are covered with a piece of label. This cutting operation can be done with a cutting means provided in the invention device, outside the box 10 and after the second opening 40, or again with any cutting device separate from the invention device.

According to another embodiment of the invention, not shown, a cutting means 50 is used that cuts a single line. An additional means is provided to separate the two ends of the strips by a length L before connecting them. In this embodiment, the cutting means 50 can be used that is provided inside the box to separate the consecutive totally light-tight strips, at the link made between the two strips. A means to position the film strip accurately in relation to this cutting means must then be provided.

Thus a strip of radiographic film of length D totally enveloped in a light-tight way is obtained.

Clearly if the operator wants several strips of radiographic film, he can separate the successive film strips after having successively separated and enveloped them by connecting them solidly together, before performing the last cutting operation.

The invention has been described in detail with particular reference to certain preferred embodiments thereof, but it will be understood that variations and modifications can be effected within the spirit and scope of the invention.

What is claimed is:

1. A device for obtaining a strip of photosensitive material of variable length D totally enveloped in a light-tight way from a reel of photosensitive material in strip totally enveloped in light-tight material, the device comprising:

a light-tight box, said light-tight box having:

a first opening which allows an introduction of a strip of photosensitive material coming from a reel;

first means for ensuring a light-tightness of said box, said first means being provided on said first opening;

a second opening which allows the strip to come out;

second means for ensuring a light-tightness of said box, said second means being provided on said second opening;

cutting means for cutting the strip at a distance D from its end and to separate by a length L the strip of length D and the rest of the strip coming from the reel;

connecting means for solidly connecting in a light-tight way and without contact between them, the strip of length D and the rest of the strip coming from the reel using a light-tight material applied to both faces of each strip; and linking means to link up the material present on one face and the material present on the other face between the two strips.

2. A device according to claim 1, that further comprises, outside the box and after the second opening, a means for cutting the light-tight material so as to obtain a strip of photosensitive material of length D totally enveloped in a light-tight way.

3. A device according to claim 1, wherein said connecting means for solidly connecting the two edges is a distributor of adhesive labels.

4. A process for obtaining a strip of photosensitive material of variable length D and totally enveloped in a light-tight way from a reel of photosensitive material in strip totally enveloped in a light-tight material, the process comprising the steps of:

a) introducing a strip of photosensitive material coming from a reel into a light-tight box;

b) bringing the strip out of the box at a length such that the strip can be cut at a distance D from an end of the strip coming from the reel;

c) cutting the strip at the distance D from its end and separating inside the box the strip of length D from the rest of the strip coming from the reel;

d) solidly connecting in a light-tight way and without contact between them the strip of length D and the rest of the strip coming from the reel using a light-tight material that is applied to both faces of each strip so as to form a connection;

e) linking up the light-tight material on one face and the light-tight material on the other face between the two strips;

f) running the strip until the connection is outside the box;

g) cutting the light-tight material so as to obtain a strip of photosensitive material of length D totally enveloped in a light-tight way.

5. A process according to claim 4, wherein steps d) and e) comprise the further step of applying an adhesive label to both faces of the strips of photosensitive material.

6. A device for obtaining a strip of photosensitive material, the device comprising:

a light-tight box having a first light-tight opening which permits the introduction of a strip of photosensitive material into said light-tight box, and a second light-tight opening which permits an exit of said strip from said light-tight box;

a cutting member which cuts the strip introduced into said light-tight box at a distance from its end to separate the cut strip by a specified length from a remainder of the strip being introduced into said light-tight box;

a connecting member which connects the cut strip and the remainder of the strip so as to be light-tight and spaced from each other, said connecting member applying a light-tight material to both faces of each strip; and a linking member which links the applied light-tight material between the strips.

* * * * *